United States Patent Office 2,697,727
Patented Dec. 21, 1954

2,697,727

METHOD OF PREPARING S-ALKYL CYANO-PSEUDOTHIOUREAS

Donald W. Kaiser, Old Greenwich, and Dagfrid Holm-Hansen Church, Westport, Conn., assignors to American Cyanamid Company, New York, N. Y., a corporation of Maine No Drawing. Application April 28, 1953,
Serial No. 351,746

4 Claims. (Cl. 260—551)

The present invention relates to a method of preparing S-alkyl cyanopseudothioureas which conform to the formula

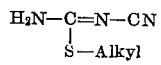

wherein alkyl stands for both the straight chain and branched chain radicals. Typical examples of these radicals are methyl, ethyl, n-propyl, isopropyl, n-butyl, isobutyl, sec.-amyl, n-hexyl, 2-ethylhexyl, n-octyl, decyl, dodecyl, cetyl, octadecyl, ceryl, allyl, 2-methylallyl and cyclohexyl.

In accordance with the present invention, the S-alkyl cyanopseudothioureas may be readily prepared by reacting an S-alkyl pseudothiourea of the formula

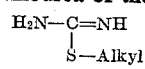

with cyanogen chloride in a liquid reaction medium.

The reaction is preferably carried out at a temperature within the range of from about 0° to 20° C. However, somewhat higher temperatures may be employed depending upon the S-alkyl pseudothiourea utilized.

Typical compounds which may be employed as reaction media in the process are acetone, methyl ethyl ketone, acetonitrile, propionitrile, dioxane, the dimethyl ether of ethylene glycol, and water.

Methods of preparing the hydrohalide salts of the S-alkyl pseudothioureas are described in the American Chemical Journal 33, 437 (1905). The S-alkyl pseudothioureas are readily obtained by neutralizing an S-alkyl pseudothiourea hydrohalide with an alkali metal hydroxide.

In the preparation of an S-alkyl cyanopseudothiourea by the present process, employing an S-alkyl pseudothiourea hydrobromide and sodium hydroxide to provide the free base, the reaction may be illustrated by the following equation:

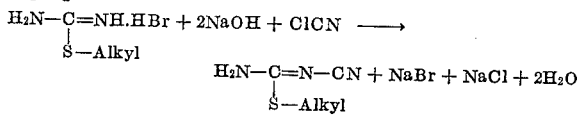

The invention is further illustrated, but not limited, by the following examples:

Example 1

40 g. (1.0 mole) of powdered sodium hydroxide was added slowly with stirring to 109 g. (0.5 mole) of S-methyl pseudothiourea hydroiodide suspended in 350 cc. of acetone at room temperature. The mixture was cooled to 5° C. and 25.5 cc. (0.5 mole) of cyanogen chloride was added as a vapor during a two-hour period. After stirring for one-half hour, the mixture was filtered to remove the inorganic salts. The acetone was allowed to evaporate from the filtrate, and the residue was filtered to remove the crude S-methyl cyanopseudothiourea. After recrystallization from acetonitrile, the product was a white crystalline solid which melted at 175° C.

Example 2

The procedure of Example 1 was employed using 105 g. of S-ethyl pseudothiourea hydroiodide, 60 g. (85.2% purity) of potassium hydroxide, 500 cc. of acetone and 23.1 cc. of cyanogen chloride. 37 g. of crude S-ethyl cyanopseudothiourea was obtained. After recrystallization from benzene, the product was a white crystalline solid which melted at 85–86° C.

Example 3

0.4 mole of sodium hydroxide was added to 0.4 mole of S-ethyl pseudothiourea hydrobromide suspended in 300 cc. of acetonitrile. The mixture was cooled to about 8° C., and 0.4 mole of cyanogen chloride vapor and 0.4 mole of sodium hydroxide as a 50% aqueous solution were added simultaneously over a one-hour period. The mixture was then filtered to remove the inorganic solids, and the filtrate was concentrated under reduced pressure. The residue of crude S-ethyl cyanopseudothiourea was recrystallized from water, giving 21 g. of the product melting at 84°–87° C.

Example 4

0.4 mole of potassium hydroxide (50% aqueous solution) was added dropwise to a solution of 0.2 mole of S-ethyl pseudothiourea hydrobromide in 200 cc. of water. 0.2 mole of cyanogen chloride gas was added during a 45-minute period, the temperature of the mixture being maintained at about 10° C. After stirring for one hour, the mixture was filtered to remove the precipitated S-ethyl cyanopseudothiourea. Recrystallization from benzene gave 11.5 g. of the product which melted at 85°–87° C.

Example 5

The procedure of Example 1 was employed, using 0.5 mole of S-allyl pseudothiourea hydroiodide, 1.0 mole of sodium hydroxide, 350 cc. of acetone and 0.5 mole of cyanogen chloride. After recrystallization from benzene, the S-allyl cyanopseudothiourea was a pale yellow crystalline solid which melted at 94–95° C.

Example 6

The procedure of Example 1 was employed using 0.5 mole of S-n-butyl pseudothiourea hydrobromide, 1.0 mole of potassium hydroxide, 350 cc. of acetone and 0.5 mole of cyanogen chloride. After recrystallization from acetonitrile, the S-n-butyl cyanopseudothiourea was a white crystalline solid which melted at 90–91° C.

The S-alkyl cyanopseudothioureas prepared by the method of the present invention are adapted for various uses, more particularly as intermediates in the production of insecticidal and fungicidal compositions, as collectors in the froth flotation of ores, and as accelerators for the vulcanization of rubber.

While the invention has been described with particular reference to specific embodiments, it is to be understood that it is not to be limited thereto but is to be construed broadly and restricted solely by the scope of the appended claims.

We claim:

1. A method of preparing an S-alkyl cyanopseudothiourea which comprises reacting an S-alkyl pseudothiourea with cyanogen chloride in a liquid reaction medium at a temperature within the range of from about 0° to 20° C., and recovering the thus-formed S-alkyl cyanopseudothiourea from the reaction mixture.

2. A method of preparing S-ethyl cyanopseudothiourea which comprises reacting S-ethyl pseudothiourea with cyanogen chloride in a liquid reaction medium at a temperature within the range of from about 0° to 20° C., and recovering the thus-formed S-ethyl cyanopseudothiourea from the reaction mixture.

3. A method of preparing S-methyl cyanopseudothiourea which comprises reacting S-methyl pseudothiourea with cyanogen chloride in a liquid reaction medium at a temperature within the range of from about 0° to 20° C., and recovering the thus-formed S-methyl cyanopseudothiourea from the reaction mixture.

4. A method of preparing S-n-butyl cyanopseudothiourea which comprises reacting S-n-butyl pseudothiourea with cyanogen chloride in a liquid reaction medium at a temperature within the range of from about 0° to 20° C., and recovering the thus-formed S-n-butyl cyanopseudothiourea from the reaction mixture.

No references cited.